United States Patent
Cohen et al.

(10) Patent No.: US 9,922,008 B2
(45) Date of Patent: Mar. 20, 2018

(54) CALLING SCRIPTS BASED TUTORIALS

(71) Applicant: Walkme Ltd., Tel-Aviv (IL)

(72) Inventors: Eyal Cohen, Moshav Regba (IL); Dan Adika, Jerusalem (IL)

(73) Assignee: WALKME LTD., Tel-Aviv (IL)

( * ) Notice: Subject to any disclaimer, the term of this patent is extended or adjusted under 35 U.S.C. 154(b) by 118 days.

(21) Appl. No.: 14/353,569

(22) PCT Filed: Oct. 18, 2012

(86) PCT No.: PCT/IL2012/050414
§ 371 (c)(1),
(2) Date: Apr. 23, 2014

(87) PCT Pub. No.: WO2013/061325
PCT Pub. Date: May 2, 2013

(65) Prior Publication Data
US 2014/0298162 A1    Oct. 2, 2014

Related U.S. Application Data

(60) Provisional application No. 61/550,526, filed on Oct. 24, 2011.

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/211* (2013.01); *G06F 17/30861* (2013.01); *G06Q 10/10* (2013.01); *G09B 5/02* (2013.01)

(58) Field of Classification Search
CPC .......................... G06F 17/211; G06F 17/30056
(Continued)

(56) References Cited

U.S. PATENT DOCUMENTS 7,506,248 B2 * 3/2009 Xu ..................... G06F 17/30893
715/240
7,546,585 B2 * 6/2009 Ault ..................... G06F 11/3688
714/38.13
(Continued)

FOREIGN PATENT DOCUMENTS

WO    WO 2013/061325    5/2013

OTHER PUBLICATIONS

Supplementary European Search Report and the European Search Opinion dated Jun. 11, 2015 From the European Patent Office Re. Application No. 12844197.9.
(Continued)

*Primary Examiner* — Stephen Hong
*Assistant Examiner* — Gregory Vaughn
(74) *Attorney, Agent, or Firm* — D. Kligler IP Services Ltd.

(57) ABSTRACT

A method of creating a dynamically adaptable tutorial, comprising: selecting at least one web document having a plurality of separate objects; providing by a user a plurality of descriptive elements; separately associating between each of said plurality of descriptive elements and each of said plurality of separate objects according to a user input; associating a plurality of calling scripts with said plurality of separate objects; making said at least web document available so that a loading thereof by a browser includes triggering said plurality of calling scripts for a retrieval of each of said plurality of descriptive elements; wherein said web document enables a browsing user who uses said browser to initiate a tutorial session during which at least a group of said plurality of descriptive elements are sequentially presented in accordance with a current layout of a respective group from said plurality of separate objects.

17 Claims, 17 Drawing Sheets

(51) Int. Cl.
  *G06F 17/21* (2006.01)
  *G09B 5/02* (2006.01)
  *G06Q 10/10* (2012.01)
  *G06F 17/30* (2006.01)

(58) Field of Classification Search
  USPC .................. 715/200, 201, 202, 203, 234
  See application file for complete search history.

(56) References Cited

U.S. PATENT DOCUMENTS

| | | | | |
|---|---|---|---|---|
| 7,555,743 B2* | 6/2009 | Sridhar | ................ | G06F 8/20 |
| | | | | 717/106 |
| 7,617,519 B2* | 11/2009 | Williams | .......... | G06F 17/30867 |
| | | | | 726/1 |
| 8,065,610 B2* | 11/2011 | Xu | .................. | G06F 17/30893 |
| | | | | 715/240 |
| 8,717,383 B2* | 5/2014 | Coldicott | ............ | G06T 11/206 |
| | | | | 345/629 |
| 2005/0042593 A1* | 2/2005 | Hopkins | ................ | G09B 5/00 |
| | | | | 434/350 |
| 2007/0015118 A1* | 1/2007 | Nickell | .................. | G09B 7/02 |
| | | | | 434/118 |
| 2007/0239760 A1* | 10/2007 | Simon | ............... | G06F 17/30873 |
| 2008/0288922 A1* | 11/2008 | Chapman | ................ | G09B 7/02 |
| | | | | 717/123 |

OTHER PUBLICATIONS

International Search Report and the Written Opinion dated Feb. 20, 2013 From the International Searching Authority Re. Application No. PCT/IL2012/050414.

International Preliminary Report on Patentability dated May 8, 2014 From the International Bureau of WIPO Re. Application No. PCT/IL2012/050414.

Communication Pursuant to Article 94(3) EPC dated Feb. 27, 2017 From the European Patent Office Re. Application No. 12844197.9. (7 Pages).

* cited by examiner

CALLING SCRIPTS BASED TUTORIALS

RELATED APPLICATIONS

This application is a National Phase of PCT Patent Application No. PCT/IL2012/050414 having International filing date of Oct. 18, 2012, which claims the benefit of priority under 35 USC § 119(e) of U.S. Provisional Patent Application No. 61/550,526 filed on Oct. 24, 2011. The contents of the above applications are all incorporated by reference as if fully set forth herein in their entirety.

FIELD AND BACKGROUND OF THE INVENTION

The present invention, in some embodiments thereof, relates to tutorials for websites and, more particularly, but not exclusively, to methods and/or systems for creating, maintaining and using dynamically adaptable tutorials.

Many existing computer software applications utilize a graphical user interface (GUI) for retrieving information and providing commands. Typically a user selects graphical elements of the GUI such as icons, drop down menus, check boxes, hyperlinks, toolbars, dialog boxes etc. by touching a screen, pointing with a mouse and/or typing keyboard shortcuts. Even though one purpose of a typical GUI is to assist a user to use the functionality of an application in a simple manner, GUIs can be complex and confusing. Users vary in their computer proficiency and familiarity with similar GUI designs and therefore a GUI may be easy to use for one user, but not for another. In addition, some computer software applications propose a large number of functionalities and advanced functionalities which leads to complex GUIs.

One way to assist a user to navigate in a GUI and perform desired actions, is to provide documentation of the GUI elements. This documentation is sometimes referred to as electronic help. A typical electronic help is organized by categories and/or tasks. Exemplary categories include: login errors, acceptable formats and/or exporting data. Exemplary tasks include: login, purchasing and/or inviting other users. Electronic help typically provides instructions for accomplishing a desired task or overcoming a problem. The instructions often describe GUI elements required to carry out the instructions. Upon modifications of the application and/or the GUI—its documentation can become irrelevant, inaccurate and/or incomplete.

SUMMARY OF THE INVENTION

According to an aspect of some embodiments of the present invention there is provided a method of creating a dynamically adaptable tutorial, comprising: selecting at least one web document having a plurality of separate objects; providing by a user a plurality of descriptive elements; separately associating between each of the plurality of descriptive elements and each of the plurality of separate objects according to a user input; associating a plurality of calling scripts with the plurality of separate objects; making the at least one web document available; wherein the at least one web document enables a browsing user who uses the browser to initiate a tutorial session during which at least a group of the plurality of descriptive elements are sequentially presented in accordance with a current layout of a respective group from the plurality of separate objects, by calling at least one of the plurality of calling scripts.

Optionally, loading of at least one web document by a browser includes triggering at least one of the plurality of calling scripts for a retrieval of at least one of the plurality of descriptive elements. Optionally, the method further comprises replacing the current layout with another layout and performing the tutorial session in accordance with another layout without changing the plurality of descriptive elements. Optionally, the method further comprises identifying a plurality of object features of the plurality of separate objects; and modifying a plurality of displayed features of the descriptive elements; wherein each of the plurality of object features is at least one of a graphical feature, a temporal feature, and a sound feature, and each one of the plurality of displayed features is changed according to the plurality of object features so that respective the plurality of descriptive elements display correspond with the plurality of separate objects. Optionally, the method further comprises displaying at least one of the plurality of descriptive elements which were modified over a web document. Optionally, providing by a user a plurality of descriptive elements and separately associating between each of the plurality of descriptive elements and the associating a plurality of calling scripts are performed by a user without the user generating code. Optionally, the method further comprises generating a plurality of triggers for a plurality of separate objects wherein the plurality of triggers activate the plurality of calling scripts which are associated with the plurality of separate objects. Optionally, the plurality of triggers are at least one of clicking a separate object, clicking an element of a separate object, clicking a next button, typing characters with a keyboard, hovering over a separate object, hovering over an element of a separate object, time period elapsing and web document refreshes, web document redirected.

According to an aspect of some embodiments of the present invention there is provided a network node of creating a dynamically adaptable tutorial, comprising: a server that allows a user to provide a plurality of descriptive elements for a plurality of separate objects of a website having at least one web document; a repository which stores the plurality of descriptive elements, each the descriptive element is separately associated with at least one of the plurality of separate objects; a calling module which receives a plurality of requests from a plurality of calling scripts which are loaded by a browser loading the website and retrieves a group of the plurality of descriptive elements in response to the plurality of requests; wherein the at least one web document enables a browsing user who uses the browser to initiate a tutorial session during which members of the group are sequentially presented in accordance with a current layout of a respective group from the plurality of separate objects.

Optionally, the network further comprises additional information content identification module which receives non browser data from at least one of settings of a browser, browser type, location, previously visited websites, tutorial statistics and website analytics. Optionally, each data unit of the non browser data is separately associated with at least one of the plurality of separate objects. Optionally, a content retrieved by the additional information content identification module is associated with a user for adjusting the dynamically adaptable tutorial according to the content. Optionally, the calling module is hosted by a server and the plurality of requests from a plurality of calling scripts are sent from an end user device to the server. Optionally, a plurality of the website is supported by the server. Optionally, the network further comprises a browsed content identification module; wherein the browsed content identification module recognizes at least one of a plurality of separate objects of a website when at least one of a plurality of separate objects of a website is browsed and the browsed content identification module triggers at least one of the plurality of calling scripts received by the calling module and each of the plurality of calling scripts is associated with at least one descriptive element of a dynamically adaptable tutorial. Optionally, at least one of the plurality of calling scripts splits the tutorial into a plurality of sequences of presenting the descriptive elements. Optionally, the network further comprises modifying the plurality of descriptive elements sequential presentation according to a current display of at least one of the plurality of separate objects.

According to an aspect of some embodiments of the present invention there is provided a web document having a dynamically adaptable tutorial, comprising: a code which creates at least one web document; and a plurality of calling scripts embedded to be loaded with the at least one web document and send a plurality of requests to a calling module for retrieving a group of a plurality of descriptive elements in response to the plurality of requests.

Optionally, at least one of the plurality of calling scripts is embedded in the code.

Unless otherwise defined, all technical and/or scientific terms used herein have the same meaning as commonly understood by one of ordinary skill in the art to which the invention pertains.

Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings.

With specific reference now to the drawings in detail, it is stressed that the particulars shown are by way of example and for purposes of illustrative discussion of embodiments of the invention.

Figure 1:
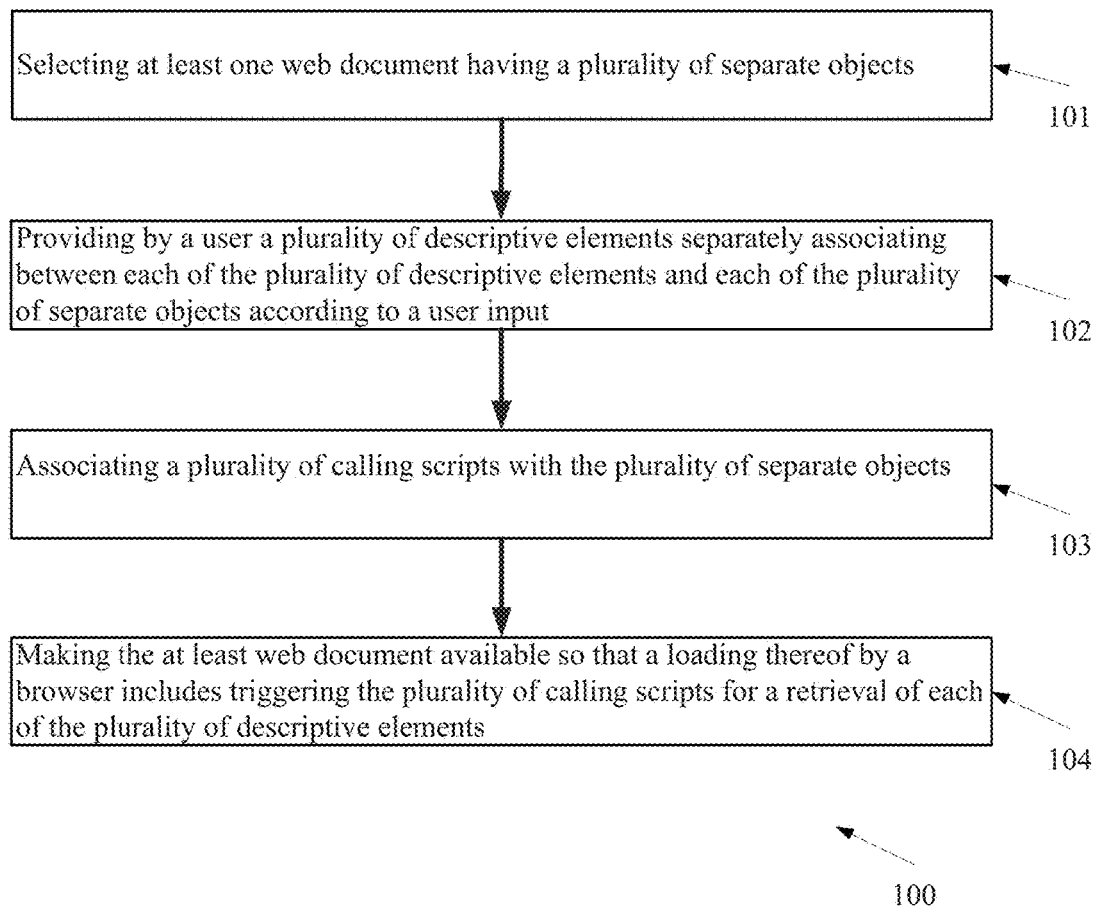

In this regard, the description taken with the drawings makes apparent to those skilled in the art how embodiments of the invention may be practiced.

Figure 2:
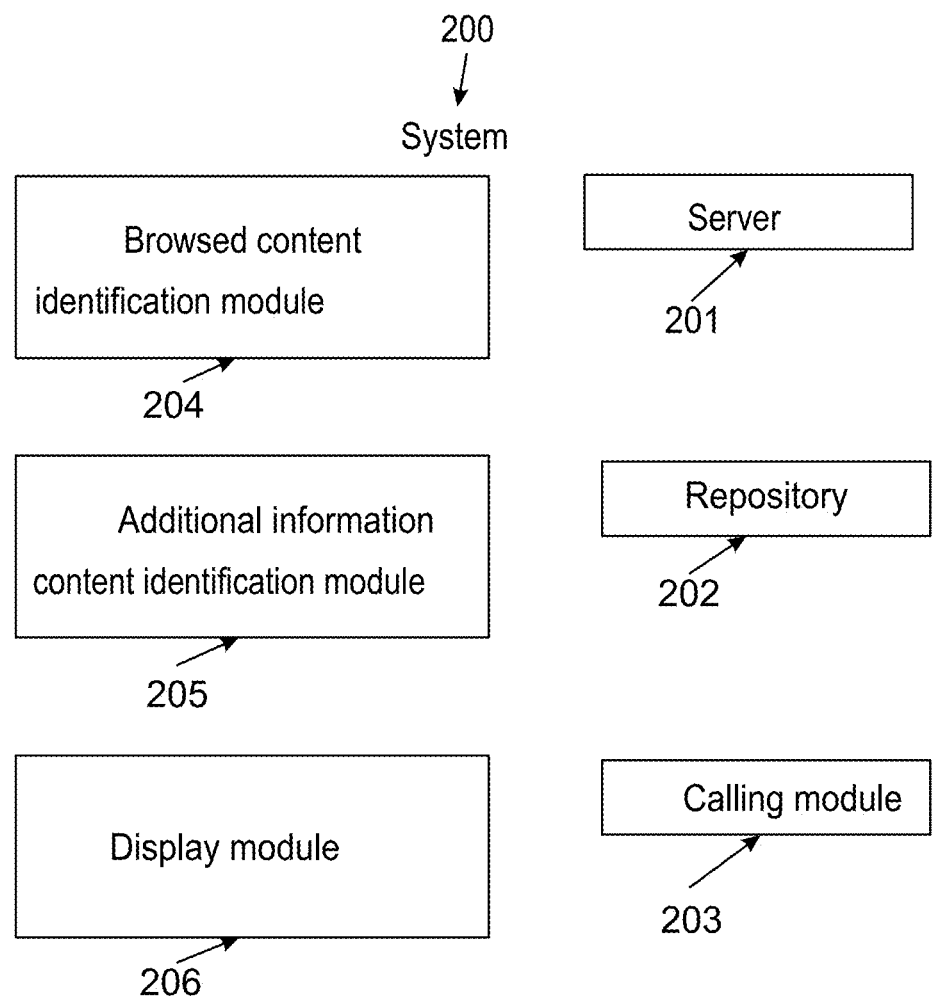
Figure 3A:
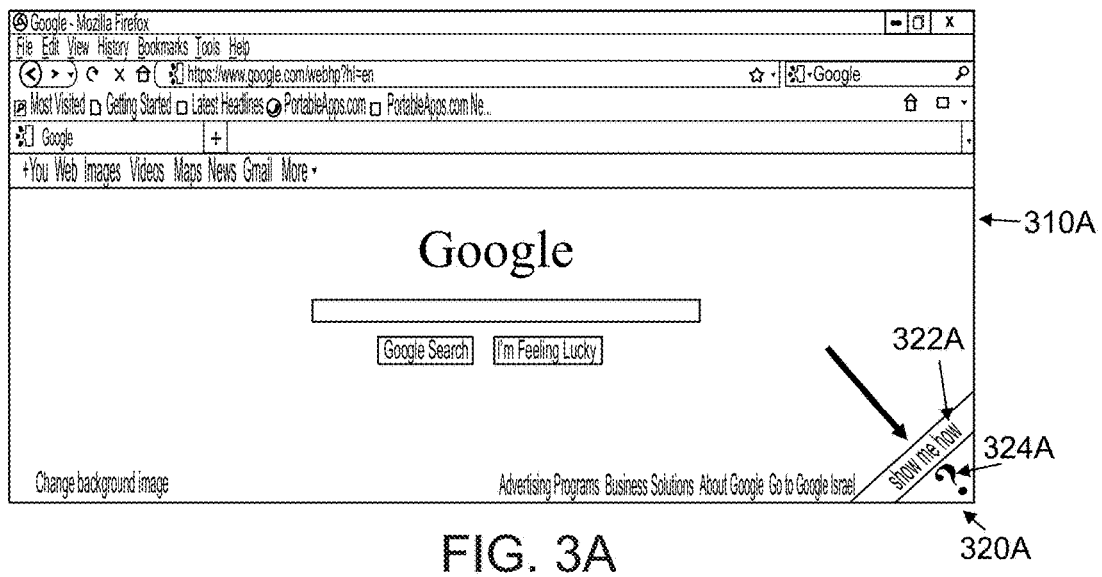
Figure 3B:
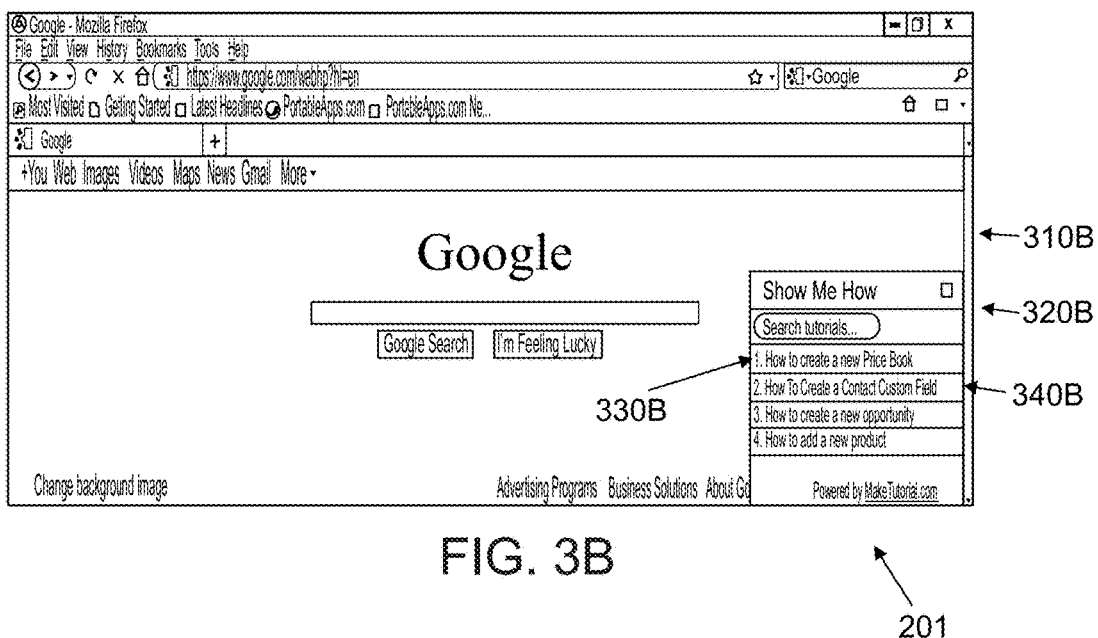
Figure 4:
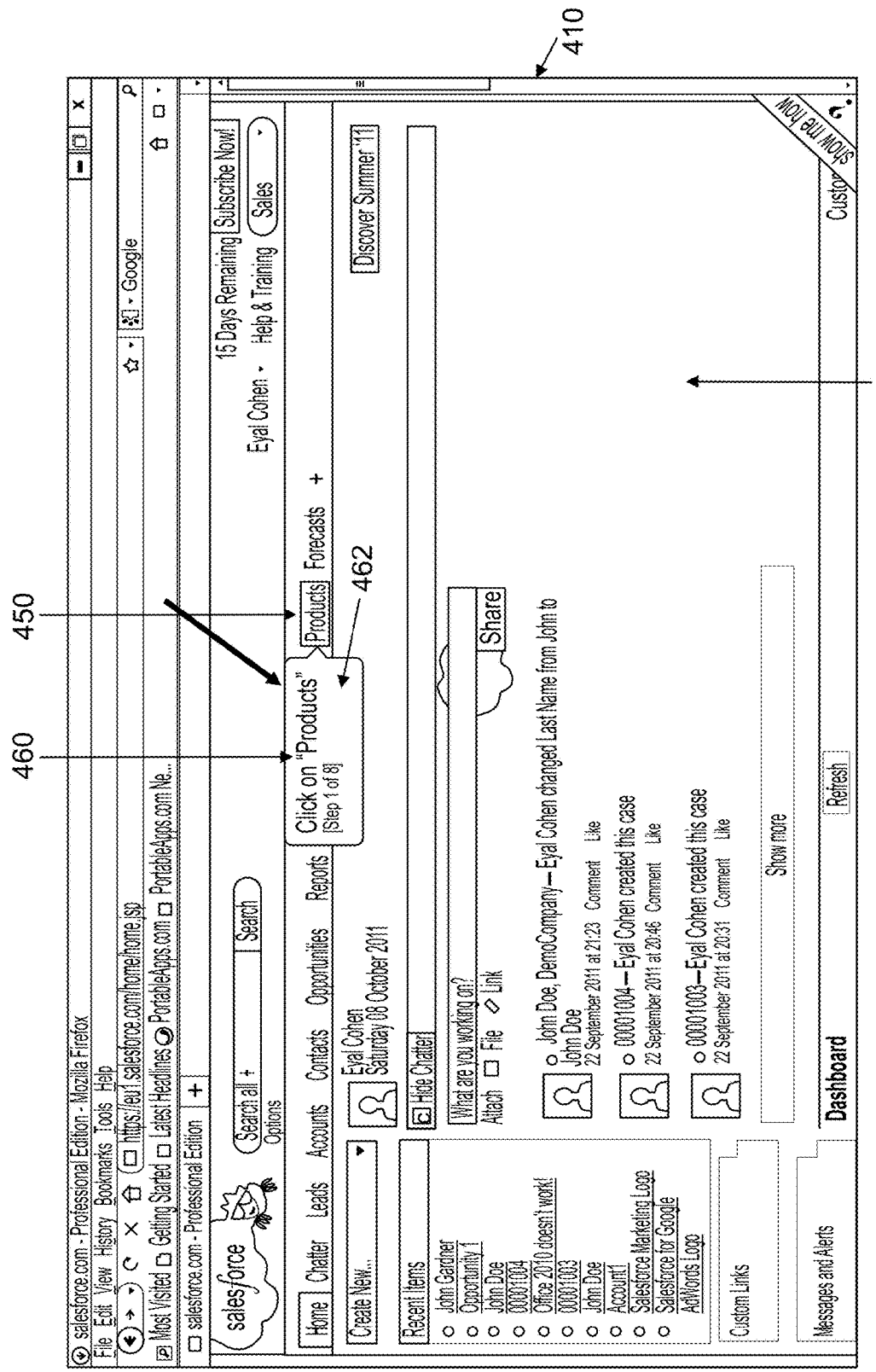
Figure 5:
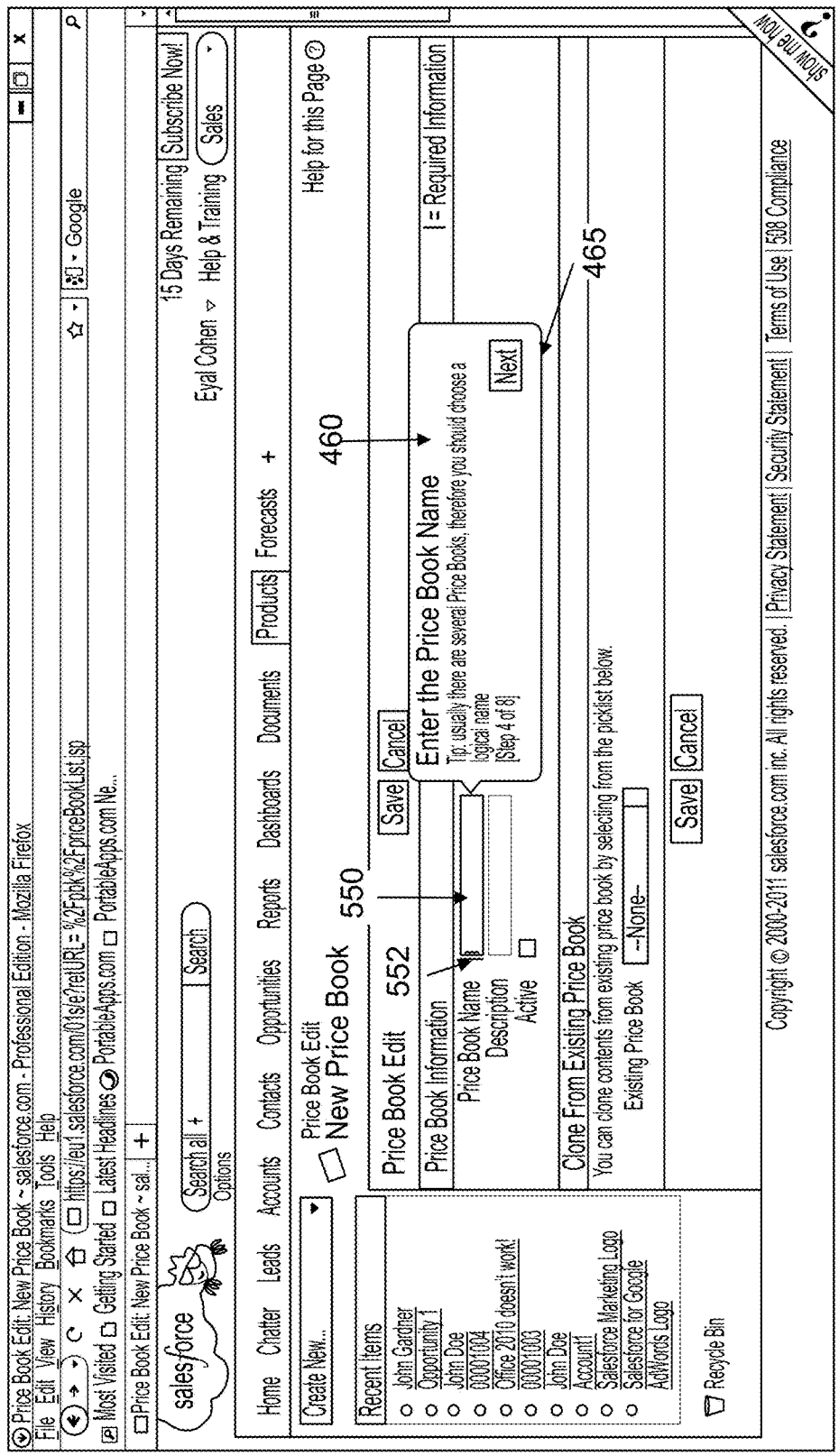
Figure 6:
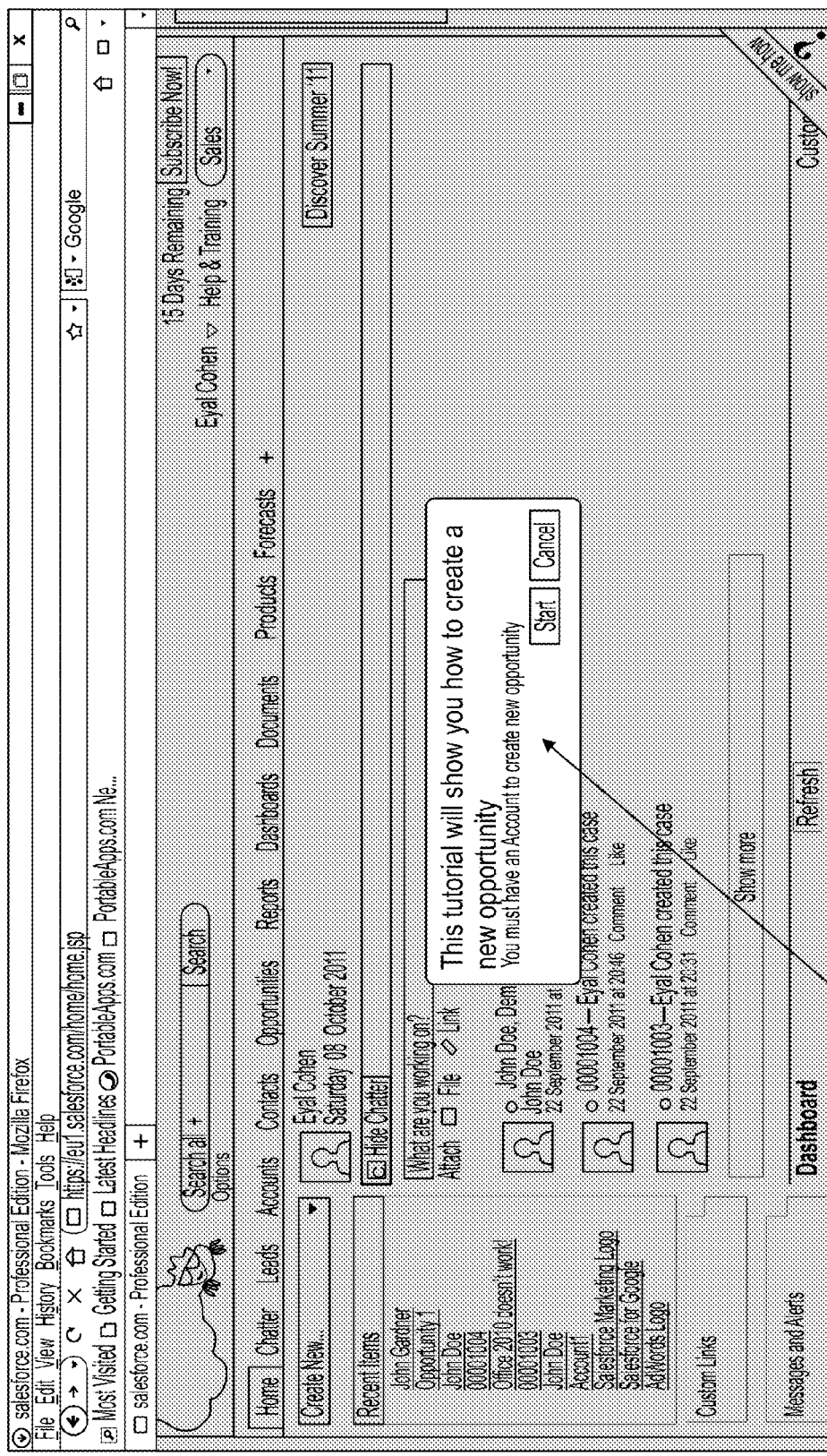

In the drawings:

FIG. 1 is a three dimensional (3D) schematic illustration of a method of creating a dynamically adaptable tutorial, according to some embodiments of the present invention;

FIG. 2 is a schematic illustration of a network node of creating a dynamically adaptable tutorial, according to some embodiments of the present invention;

FIG. 3A is a schematic illustration of a web browser with a dynamically adaptable tutorial in closed configuration;

FIG. 3B is a schematic illustration of a web browser with a dynamically adaptable tutorial in an open configuration;

FIG. 4 is a schematic illustration of a descriptive element displayed in association with an object of a website, according to some embodiments of the present invention;

FIG. 5 is a schematic illustration of an identification of browsed content as part of a dynamically adaptable tutorial, according to some embodiments of the present invention;

FIG. 6 is a schematic illustration of a welcoming message box to a user that starts the tutorial session, according to some embodiments of the present invention; and FIGS. 7A-7K are schematic illustrations of a user interface for creating and editing descriptive elements, according to some embodiments of the present invention.

DESCRIPTION OF EMBODIMENTS OF THE INVENTION

The present invention, in some embodiments thereof, relates to tutorials for websites and, more particularly, but not exclusively, to methods and/or systems for creating, maintaining and using dynamically adaptable tutorials having calling scripts which triggers the display of descriptive elements associated with separate objects.

A few scenarios may change the GUI, for example a change in the application, usage of a different browser and/or UI modifications. If the GUI is changed after the help documentation is written, then the help documentation may no longer accurately describe the GUI. Such errors in the help documentation may result in users not being able to properly use the software application. In some cases, the help documentation may be corrected by manually revising it to update any references to the GUI. However, a manual revision process is usually costly and time-consuming. Further, if the changes to the GUI occur due to user customization, software add-ons, or modal use, a manual revision of the help documentation is often impractical. Furthermore, since changes to the GUI due to user customization and modal use can occur repeatedly, any manual revisions would also have to be repeated. Thus, in certain situations, the manual revision of the help documentation is not suitable for correcting errors.

According to some embodiments of the present invention, there are provided methods and system for generating a dynamically adaptable tutorial that enables guiding a user through a sequence of actions in a website without depending on a specific layout of the website. In such a manner, the dynamically adaptable tutorial is substantially indifferent to webpage layout changes and/or browser effect.

A dynamically adaptable tutorial enables to present sequentially descriptive elements in accordance with a current layout of a web document. The web document has separate objects, such as a button, an input box, a menu etc. The dynamically adaptable tutorial which is loaded with the web document includes descriptive elements such as text, audio and/or video segments which typically include instructions and/or examples of usage are associated with respective separate object of the web document. Calling scripts are also associated with respective separate object of the web document. Upon loading of the objects in a certain web document with a current layout, the respective descriptive elements of the tutorial are loaded in accordance with the current layout.

The dynamically adaptable tutorial is created according to user instructions received by a user interface. The user interface enables a user to provide descriptive elements and to store them in a repository. The user interface enables a user to associate the descriptive elements with separate objects of a website. The user interface further enables a user to determine the sequence of presenting descriptive elements. Once the tutorial is created, a calling module receives requests from calling scripts. There is a cross talk between the calling module and the browser: The browser loads calling scripts which send request to the calling module and the calling module responds by sending the corresponding descriptive elements.

The tutorial may be set to match content browsed by a user. A browsed content identification module recognizes separate objects of a website when they are browsed by a user. The browsed content identification module in response sends requests for calling scripts to trigger them. The descriptive elements and/or their sequential presentation may be modified according to identified browsed content. The descriptive elements and/or their sequential presentation may also be modified according to information recognized by the additional information content identification module.

Referring now to the drawings, FIG. 1 is a 3D schematic illustration of a method 100 of creating a dynamically adaptable tutorial, according to some embodiments of the present invention. A user interface allows a user to create and/or modify a dynamically adaptable tutorial. The dynamically adaptable tutorial is then embedded in a web document and/or a group of web documents. The dynamically adaptable tutorial walks a user through the web document(s) and/or a process related to the web document(s), for example: login, purchasing a product, form completion, information search etc. The web document enables a browsing user who uses a browser to initiate a tutorial session. First, at least one web document is selected 101. The web document has a plurality of separate objects. Examples of separate objects include: buttons, links, input fields such as text boxes, drop down menus and/or the like. The descriptive elements are sequentially presented in accordance with a current layout of a respective group of separate objects. The descriptive elements may contain explanatory information pertaining to the website, which is directed to assist a visitor of a website to orient oneself in the website, to be able to reach the website information or to accomplish a website related process, for example: purchasing an item from an online commerce website. Then, a plurality of descriptive elements is provided by a user 102. The descriptive elements for separate objects of a website may be textual, audio and/or a combination thereof. The audio descriptive elements may be played without and/or without accompanying graphical elements. The audio descriptive elements may be a premade sound file(s) and/or an automatically generated text-to-speech element. Each descriptive element is separately associated with a separate object of a web document according to a user input 102. A descriptive element may be associated with multiple separate objects. Then, calling scripts are associated with separate objects of the web document(s) 103. The calling scripts may include placement of a player, instruction lines that identify the objects on the screen, and/or identify user interaction to proceed to the next steps. The instruction lines may draw the presentation of the instruction, such as tip-balloons, next to the identified screen objects along with matching text, images, video, audio, shaped and/or colored according to the design of the user. Finally, at least one web document is made available so that a loading by a browser includes triggering the calling scripts for a retrieval of each of the descriptive elements 104.

Optionally, when replacing a current layout of a web document with another layout and performing a tutorial session in accordance with the new layout the descriptive elements do not need to be changed. As each separate element is associated with a descriptive element on one hand and a calling script on the other hand, the correct descriptive element is presented for the separate element regardless of its layout.

Optionally, the dynamically adaptable tutorial supports multiple layouts used by different users and/or displayed in different browsers at the same time. Optionally, identifying features of separate objects in a web document are identified. The separate objects' features include: graphical features, temporal features and sound features. Then, optionally, the displayed features of the descriptive elements are modified accordingly. The displayed features of the descriptive elements are changed according to the identified features of the plurality of separate objects. The change in displayed features is performed so that the descriptive elements display fit the separate objects of a web document and/or one another. Optionally, the dynamically adaptable tutorials, which may be audio tutorials, textual tutorials and/or other tutorials, may be synchronized with at least one HTML element. The HTML element may be highlighted in an internet browser in synchronization with the tutorial. Optionally, a descriptive element may be repositioned by a user. For example, a tipped-balloon is release from its location in proximity to the separate object it is associated with upon dragging the tipped-balloon. The user may reposition the balloon, for example by mouse movement, keyboard arrows, and/or the like. Optionally, the tutorial may be adapted according to a user's characteristics. The characteristics of the user include: language, skill level, visual preferences. The characteristics may be determined by the Internet Protocol (IP), a user's settings, browsing history, login name etc. Optionally, the dynamically adaptable tutorial displays online images, images, banner and other advertising material on top of a web document. Optionally, the dynamically adaptable tutorial may be integrated to a web document by inserting a generic code along with unique user identification.

The inclusion of such code may be performed in a way similar to state of the art tags such as "Google analytics". All visitors of this web document, now including the inserted code, see the dynamically adaptable tutorial using any internet browser and are able to use it. The analytics data may be transferred to an additional information content identification module. The additional information content identification module may receive other non browsed data such as language settings of a browser, browser type, location and/or previous visited websites.

Reference is now made to FIG. 2, which is a schematic illustration of a network node 200 of creating a dynamically adaptable tutorial, according to some embodiments of the present invention. As used herein, the term network node refers to any computer system, device and/or process that is uniquely addressable and/or is otherwise uniquely identifiable, in a network and that is operable to communicate with other nodes in the network. The network node 200 includes a server 201, a repository 202 and a calling module 203. The server 201 receives descriptive elements for a plurality of separate objects of a website. The server 201 communicates with a client. The client enables a user to provide the descriptive elements for a plurality of separate objects of a website. The descriptive elements 460 are as described in FIG. 4. The user interface 201 is as described in FIGS. 7A-7K. The website has at least one web document 310. The repository 202 stores the descriptive elements. Each descriptive element is separately associated with one or more separate object. The calling module 203 receives requests from calling scripts. The requests for calling scripts may be initiated by triggers such as element clicking, next button, keyboard typing, element hovering, choosing between multiple descriptive elements, predefined time duration, page refresh and/or page redirection. These triggers are typically used to advance a sequence of descriptive elements in a dynamically adaptable tutorial to a next sequential step. A dynamically adaptable tutorial may continue to the next step only when a user clicks inside the separate object which is associated with the currently displayed descriptive element. For example, a balloon is associated with a button. The tutorial will advance to the next step only upon a user clicking the button.

A descriptive element may have a 'Next' button. Only when the user clicks on the 'Next' button, the next step appears.

A descriptive element may be associated with a separate object which enables text typing.

A calling script requests the calling module to retrieve descriptive elements, thereby advancing the dynamically adaptable tutorial to a next step, after a user types any characters into the typing enabling separate object. Such a trigger may be used for separate object with text boxes and/or forms.

A dynamically adaptable tutorial may be advanced to a next step upon a user hovering over the separate object to which the descriptive element is attached and/or a user hovering over the descriptive element. A branching dynamically adaptable tutorial may be branch upon a user selection of a descriptive element from multiple optional descriptive elements, such as multiple balloons displayed together next to one another.

The time period for displaying a descriptive element may be pre-set. The dynamically adaptable tutorial continues to the next step after the pre-set time period. Optionally, a default time is pre-set. Optionally, upon a page refresh a dynamically adaptable tutorial continues to the next step: displaying the descriptive element next in sequence on the new page. Optionally, upon a redirection a dynamically adaptable tutorial continues to the next step: displaying the descriptive element next in sequence on the new page. The calling scripts are loaded by a browser loading the website.

A group of descriptive elements is retrieved in response to these requests. The web document enables a browsing user who uses a browser to initiate a tutorial session. During the tutorial session members of the group of descriptive elements are sequentially presented. The presentation of the descriptive elements is in accordance with a current layout of a respective group from separate objects.

Optionally the network node 200 includes a browsed content identification module 204. At least one separate object of a website is recognized by the browsed content identification module 204. The objects recognized by the browsed content identification module 204 may be different from the ones described by the plurality of descriptive elements. The adaptation of a descriptive element may be performed by features not directly associated and/or synchronized with the adapted descriptive element.

The plurality of separate objects may be hypertext markup language (HTML) elements, for example: a sentence, a textbox, an image, a button or another element in a HTML web document. It is noted that some websites, however, provide non-HTML information, (e.g. Silverlight and Flash websites). Optionally, the browsed content identifying module 320 determines a size, a location, timing, duration, and the like, of displayed descriptive elements using pixel coordination (X, Y). Optionally, the browsed content identification module 204 may highlight the browsed elements by displaying graphical elements on top of the website that is being browsed. Optionally, features of a plurality of separate objects in a web document are identified.

The identification of features of a plurality of separate objects may be performed by the browsed content identification module 204. The identified features may include graphical features such as location and/or size, temporal features, such as timing and/or duration, and/or sound features, such as volume. The features may be identified as they are being provided by an internet browser. Optionally, additional information content identification module 205 retrieves information other than browsed content. Exemplary information retrieved by the additional information content identification module 205 includes: language selection, language settings, skill level, audio preferences, visual preferences, multimedia devices availability, multimedia preferences etc. The additional information content identification module 205 may retrieve textual information, illustration data, sounds, and/or the like. The textual information may be an overview textual information of a website and/or tutorials textual information. The textual information may or may not be related to a specific object of the website. The illustration data may be, for example, highlighted colors, arrows and other graphical aids.

Optionally, the network node 200 includes a display module 206. The display module 206 displays the descriptive elements called upon by the calling scripts. The display parameters of the descriptive elements may be determined by the display module 206 according to the browser type displaying the elements, the current layout of the web document, the location of previous and/or next steps in the tutorial, the colors of the current layout, user's volume preferences, display device type etc.

Reference is now made to FIG. 3, which is a schematic illustration of a dynamically adaptable tutorial in closed and open configurations, according to some embodiments of the present invention. FIG. 3A illustrates a web browser 310 with a dynamically adaptable tutorial in closed configuration 320A. The closed configuration 320A of the dynamically adaptable tutorial appears in a highly visible location in the web browser 310, for example at the bottom right corner of the web browser 310. The closed configuration 320A of the dynamically adaptable tutorial may be distinctively identified by a shape such as is a triangle, a text 322, an icon 324, a sound, other identification means and/or a combination thereof. When a user interacts with the closed configuration 320A, the dynamically adaptable tutorial switches to an open configuration 320B as shown in FIG. 3B. The user interaction may be a click, a hover, a touch, other means for choosing a web element and/or a combination thereof. FIG.

3B illustrates a web browser 310 with a dynamically adaptable tutorial in an open configuration 320B. The open configuration 320B is bigger in size than the closed configuration 320A. The display parameters of the open configuration such as display location, shape, colors etc. may differ from the closed configuration 320A. In this example the open configuration 320B is a square shape. The dynamically adaptable tutorial open configuration 320B may provide functionalities such as searching for an existing tutorial by its name and listing existing tutorials 340.

Reference is now made to FIG. 4, which is a schematic illustration of a descriptive element displayed in association with an object of a website, according to some embodiments of the present invention. In this example, a web document 405 is displayed in a web browser 410. The web document 405 has multiple separate objects 450. One of them is a products tab object 450. A descriptive element 460 is associated with the separate object 450. The descriptive element may include text. For example, the text may include clicking instructions such as "Click on "Products"". The shape of the descriptive element 460 may indicate the association to one or more separate objects 450. For example, the bubble-shape 462 points to the Products tab 450. The descriptive element 460 may be part of a sequence of descriptive elements. The descriptive element 460 may indicate the number of the current step and the total number of steps in the sequence. Optionally, a tutorial may take an end-user(s) through a serial step-by-step business process, where each step in the flow is mandatory for the successful completion of the business process. In such a tutorial an end user has to perform each and every step of the process. Steps' triggers determine which action must be performed by the end-user in order to continue to the next step of a dynamically adaptable tutorial. Without activating the step trigger, such as clicking on a separate element, entering text etc., the tutorial u will not continue to the next step. Such a tutorial may assure that a user performs all necessary steps and complete the process. Optionally, the sequence of descriptive elements is modified by skipping steps and/or repeating steps. A step may be skipped even if its trigger isn't activated. For example, if the balloon of a skip-able step disappears for some reason, such as page refreshing, the next step pops up, even when the user does not activate the trigger. Optionally, as long as the element is present on a page its descriptive element, such as a balloon, appears in the page. Only when the user activates the trigger—it will continue to the next step. Such a "sticky step" overcomes a refresh scenario in which a user need to activate a trigger before the tutorial continues and the page refreshes.

Reference is now made to FIG. 5, which is a schematic illustration of an identification of browsed content as part of a dynamically adaptable tutorial, according to some embodiments of the present invention. A web document is displayed in a web browser. The web document has multiple separate objects 550. One of them is a Price Book Name user input box object 550. When a user moves the cursor 552 to the Price Book Name user input box object 550 the browsed content identification module recognizes this object 550 is browsed. The associated calling script is invokes. In this example, the calling script results in displaying the descriptive element 460 associated with the browsed object 450. The display of the descriptive element 460 may include a button 465, such as a next button to assist the user in progressing along a sequence of a group of descriptive elements. The sequence of a group of descriptive elements may represent a process such as purchasing an item in an e-commerce website, creating a profile etc. Optionally, a "Fake Step" is integrated into the tutorial's sequence. A fake step is like any other regular step in terms of creating it. The process of creating a fake step may be similar to other "regular" steps. For example, selecting a separate object 550, choosing a trigger and typing some text displayed in a balloon as a descriptive element. A fake step is not presented during a tutorial. Optionally, an "Invisible Step" is integrated into the tutorial's sequence. An invisible step enables a user to place descriptive elements such as live balloons, which are present on a page with regular triggers but is not visible to an end-user upon viewing the tutorial. This allows a user to place descriptive elements on screen displayed elements, non separated objects and/or a group of objects. It may allow referring to presented elements without generating additional code. Optionally, a tutorial starts playing and/or a tutorial advances in the step sequence upon a user clicking and/or hovering over elements associated with the invisible step.

Figure 7A:
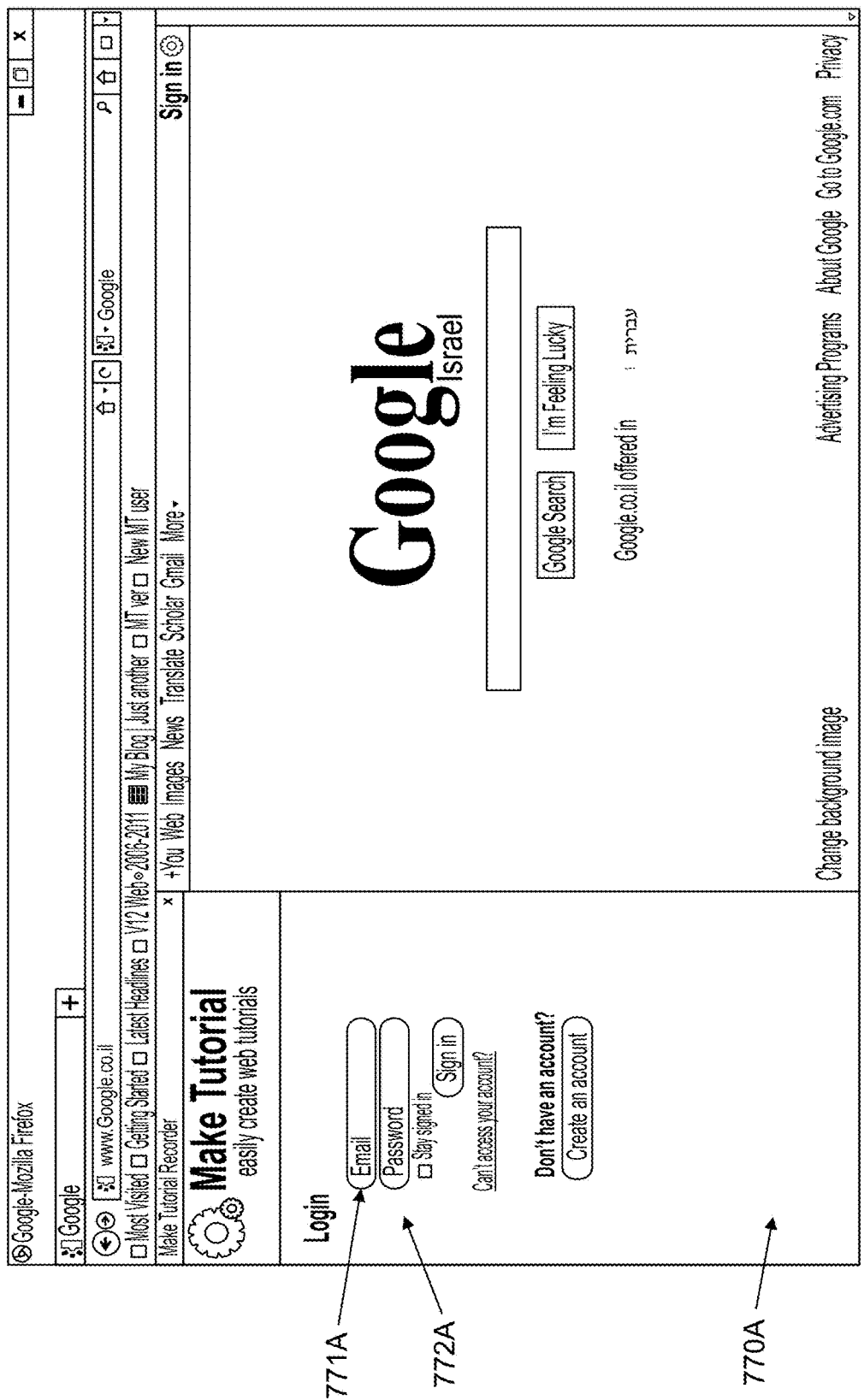
Figure 7B:
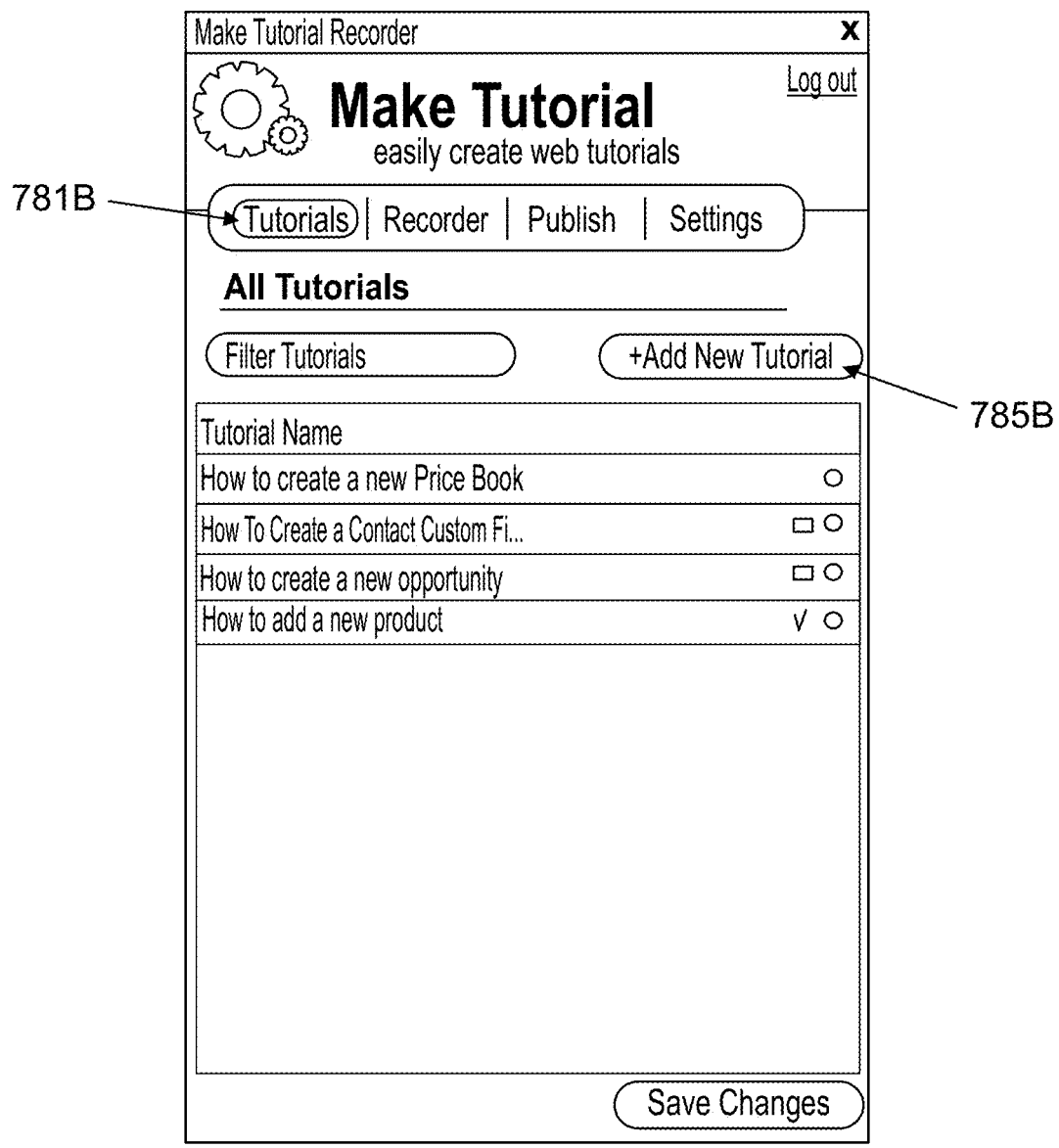
Figure 7C:
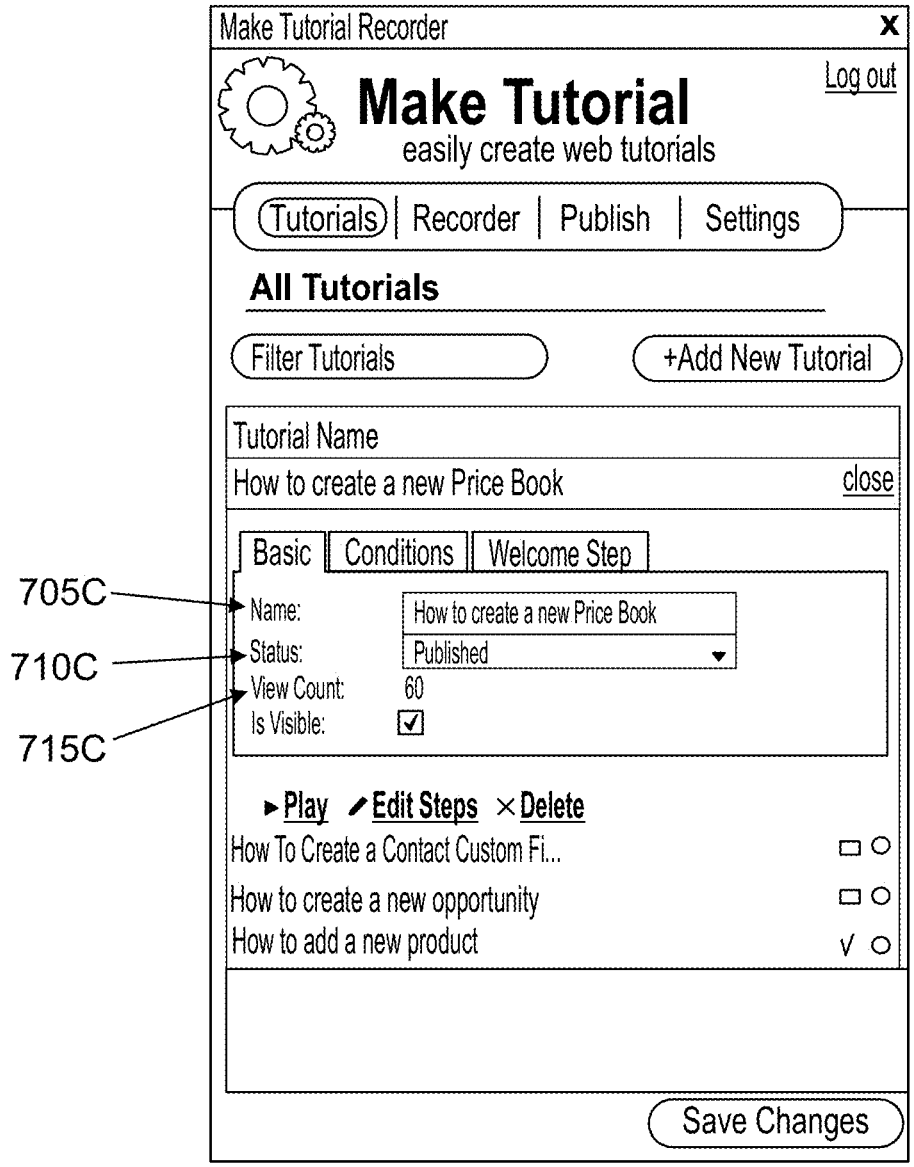
Figure 7D:
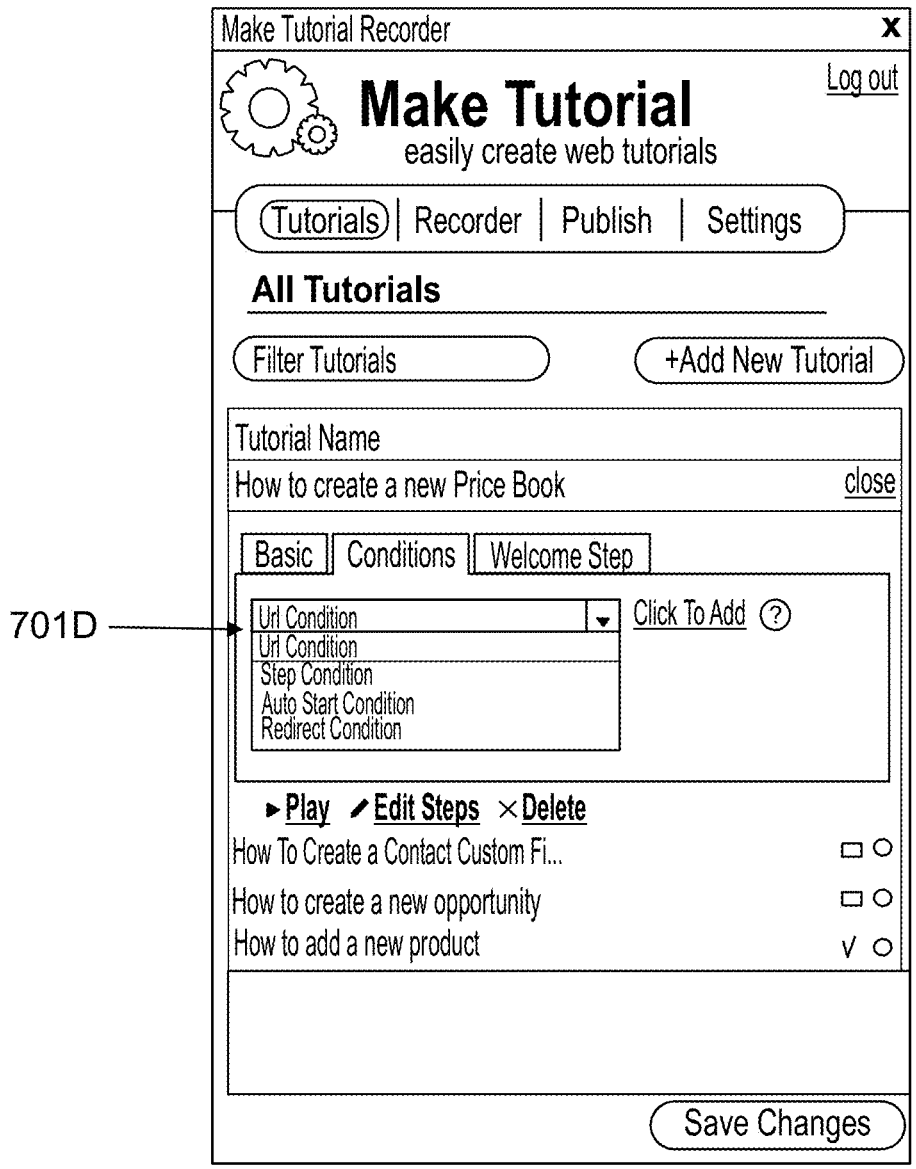
Figure 7E:
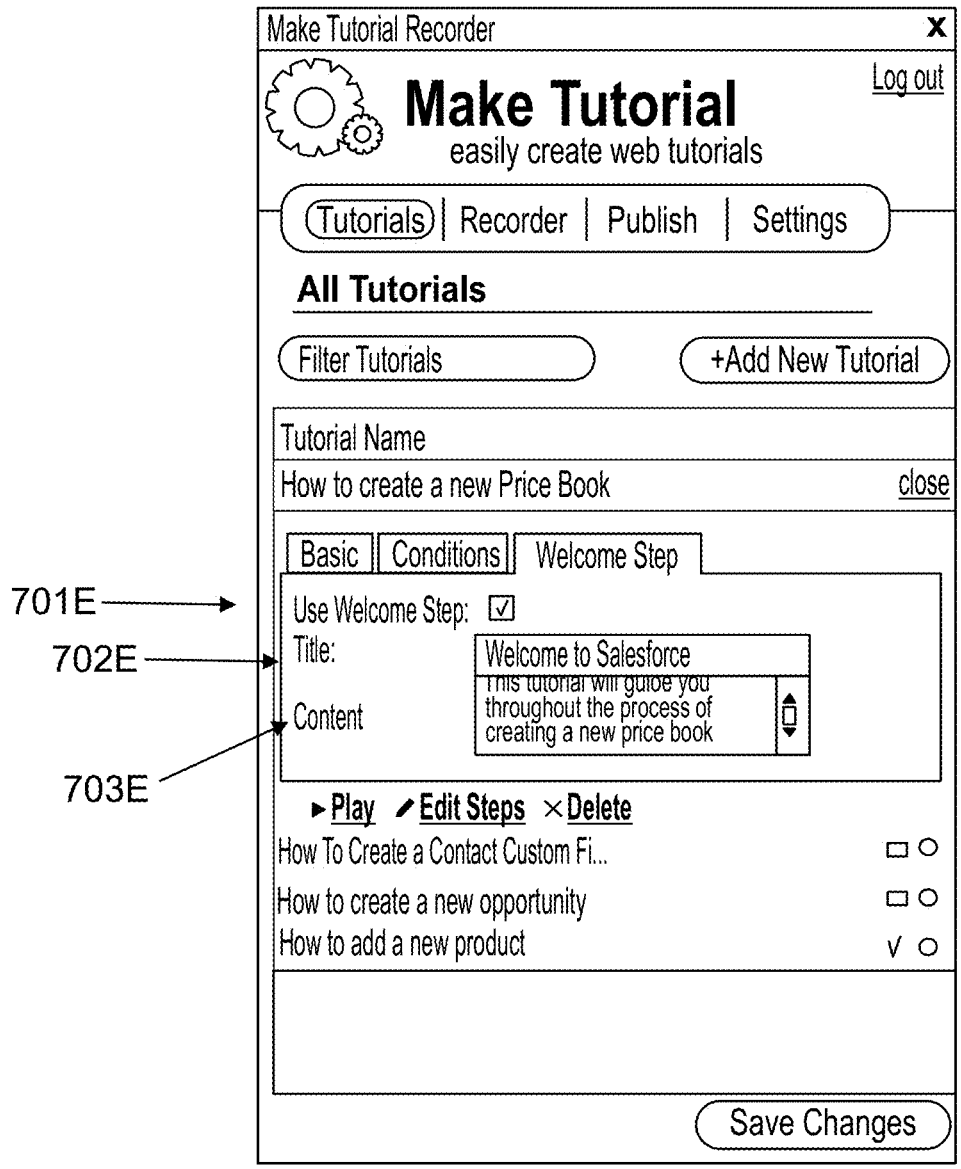

Reference is now made to FIG. 6 which illustrates a welcoming message box 670 to a user that starts the tutorial session, according to some embodiments of the present invention. The welcoming message box 670 asks for the participation of the user. The existence of this optional welcome step is determined in the tutorial creation as shown in FIG. 7E. Optionally, redirection to a web document precedes an initiation of a tutorial session. For example, if a certain tutorial starts with a homepage, that homepage may be displayed across the entire website. Wherever a user plays the tutorial, it automatically redirects the user to that homepage and then start the tutorial session. Optionally, an Auto-start enables automatically starting to play a tutorial session upon reaching a specific page. The identification of the specific page may be performed by using its URL and/or one of the elements in it. Optionally, additional conditions are generated for an auto-start of a tutorial session. Any page that matches such a condition causes the tutorial session to auto-start when the page is loaded and/or a user browse to it. Optionally, a tutorial session starts playing from a step different than the first one, upon reaching a specific page. Optionally, different web pages have different starting points in the tutorial sequence. The identification of the specific page may be performed by using its URL and/or one of the elements in the page. The steps which are not the configured starting point are skipped.

Reference is now made to FIGS. 7A-7K, which are schematic illustrations of a user interface for creating and editing descriptive elements, according to some embodiments of the present invention. The user interface assists a user in the process of setting up a tutorial of a group of sequentially presented descriptive elements.

Figure 7F:
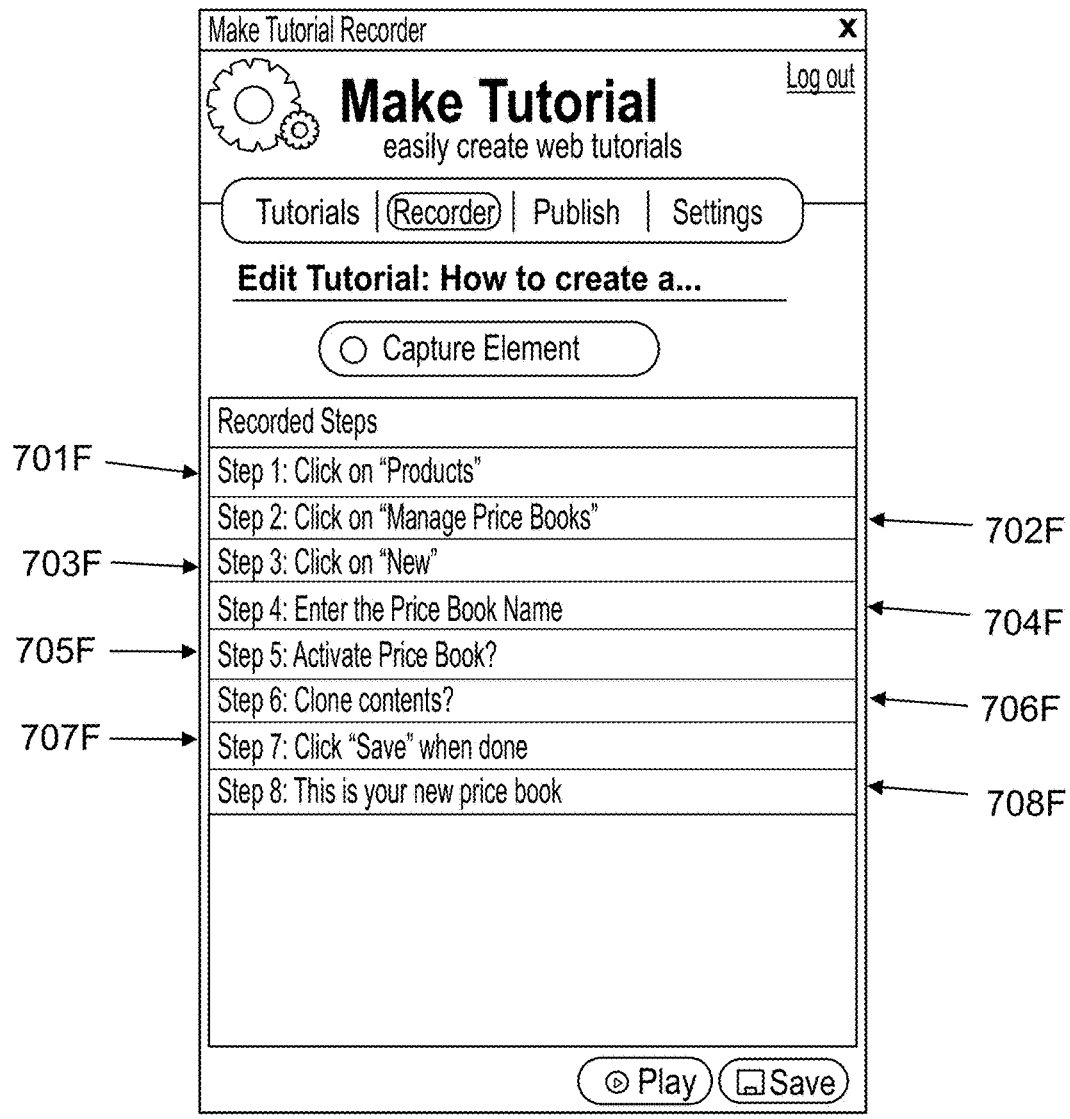
Figure 7G:
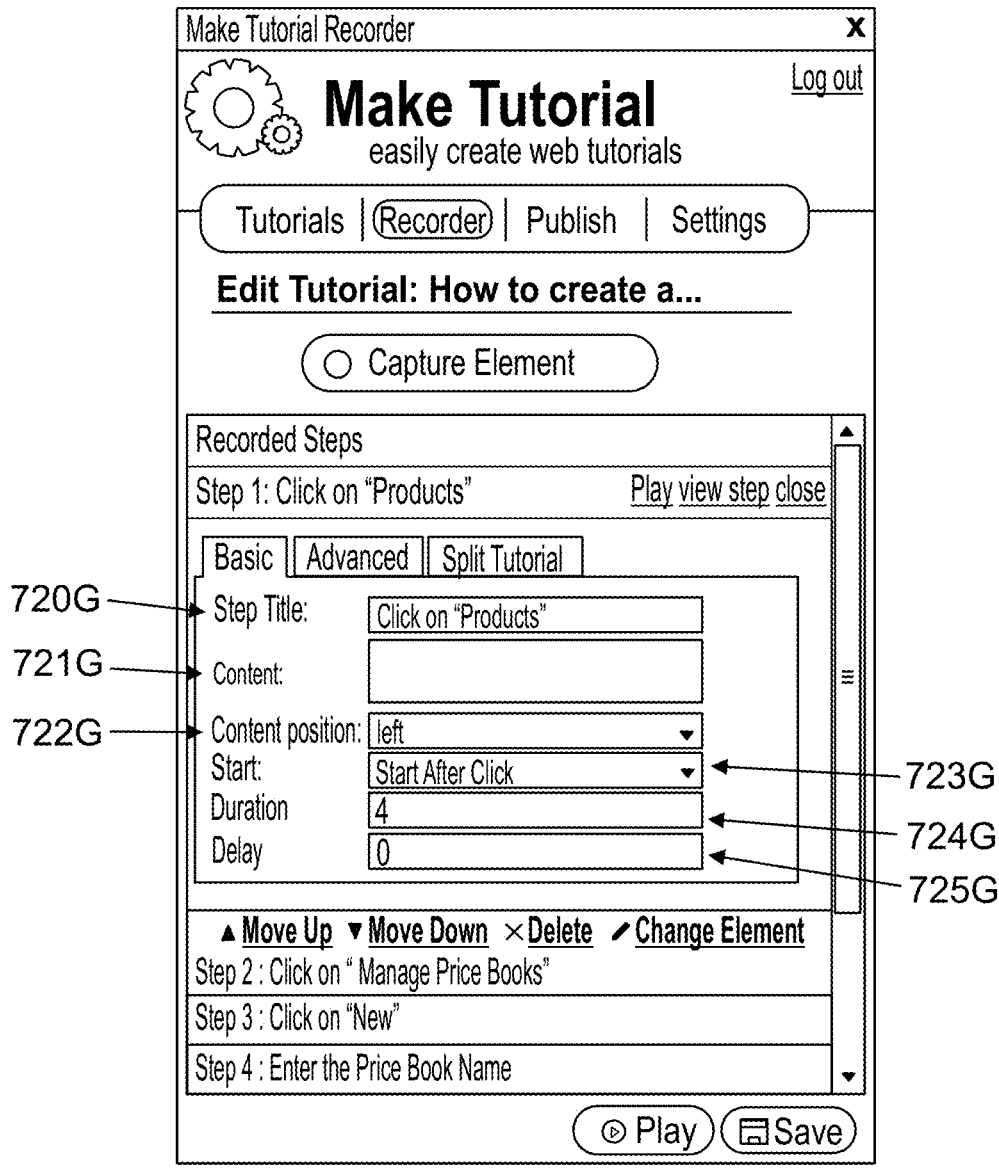
Figure 7H:
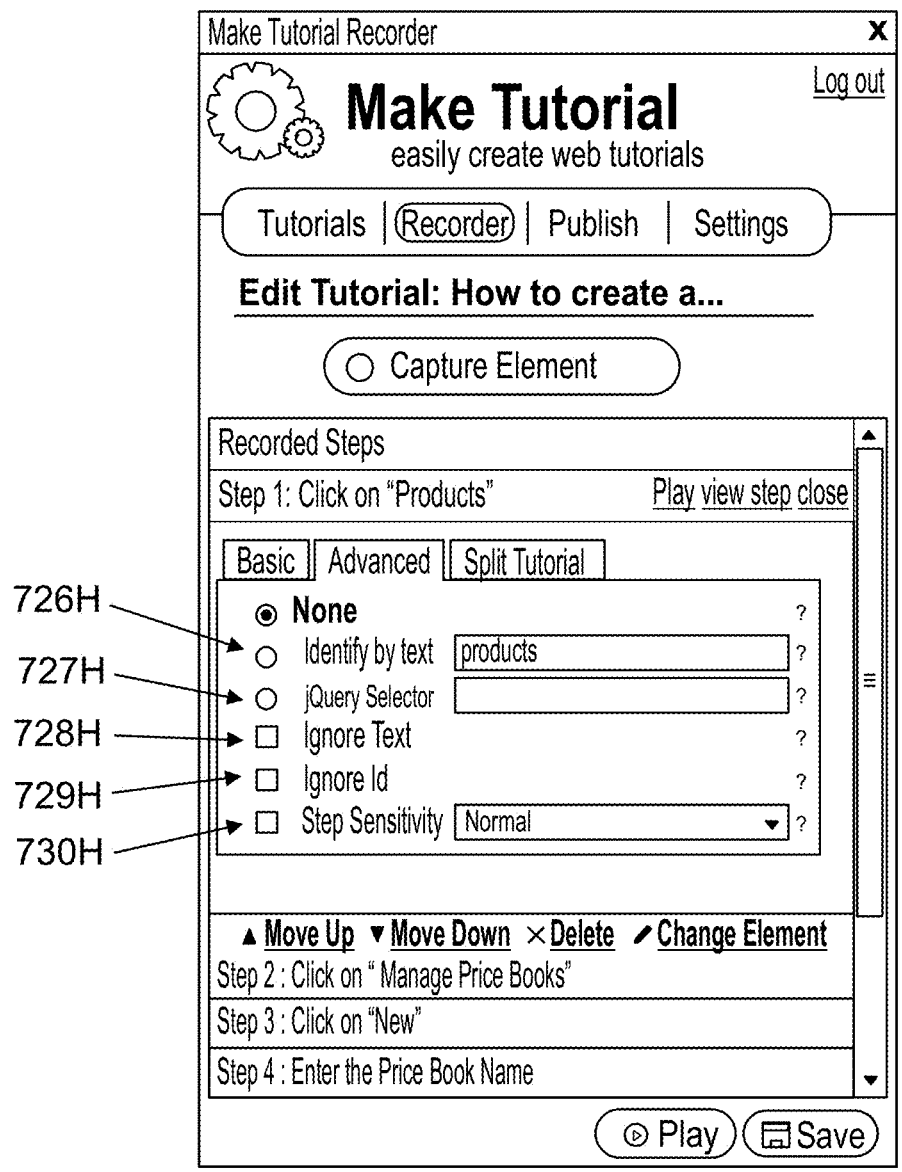
Figure 7I:
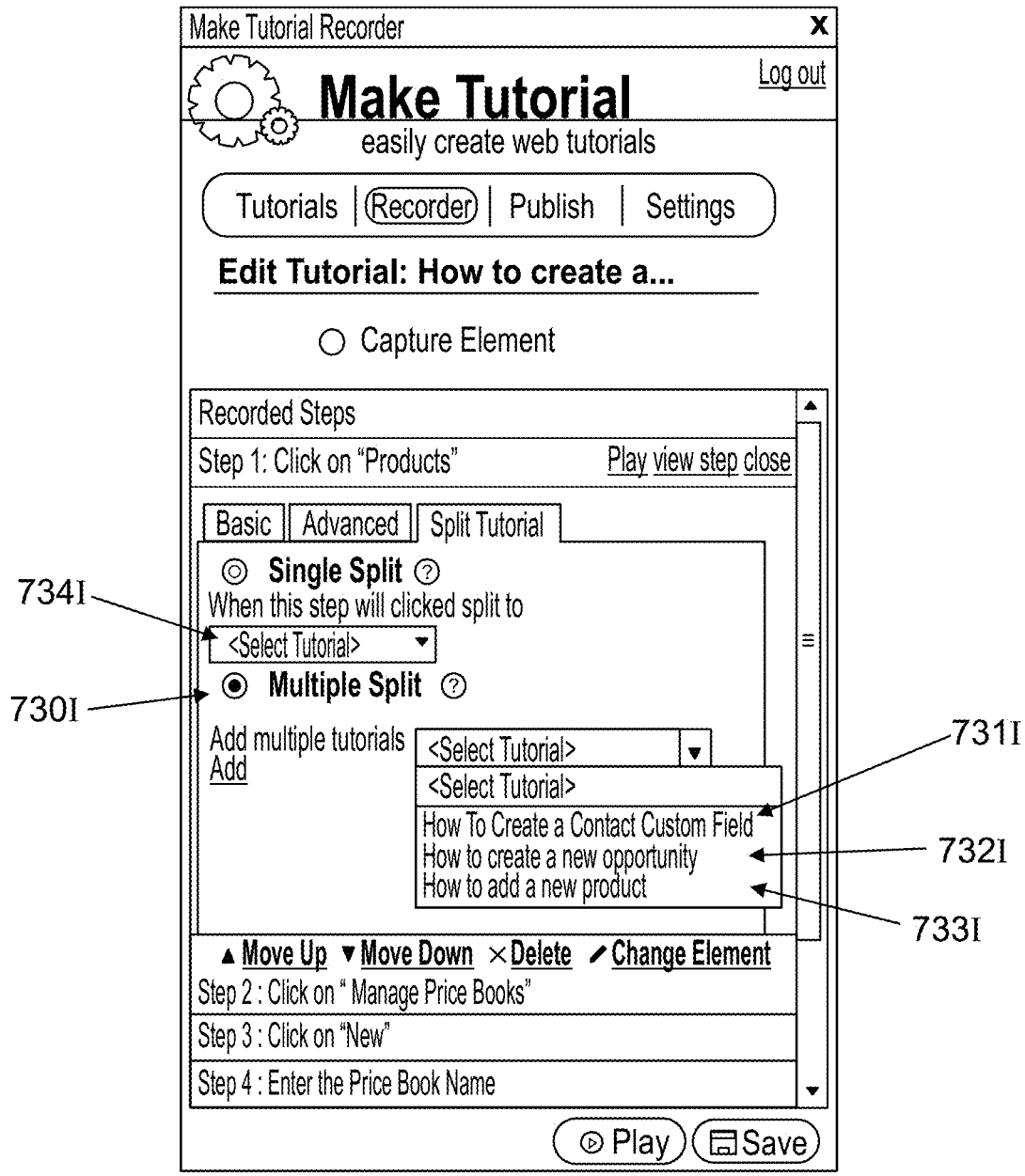
Figure 7J:
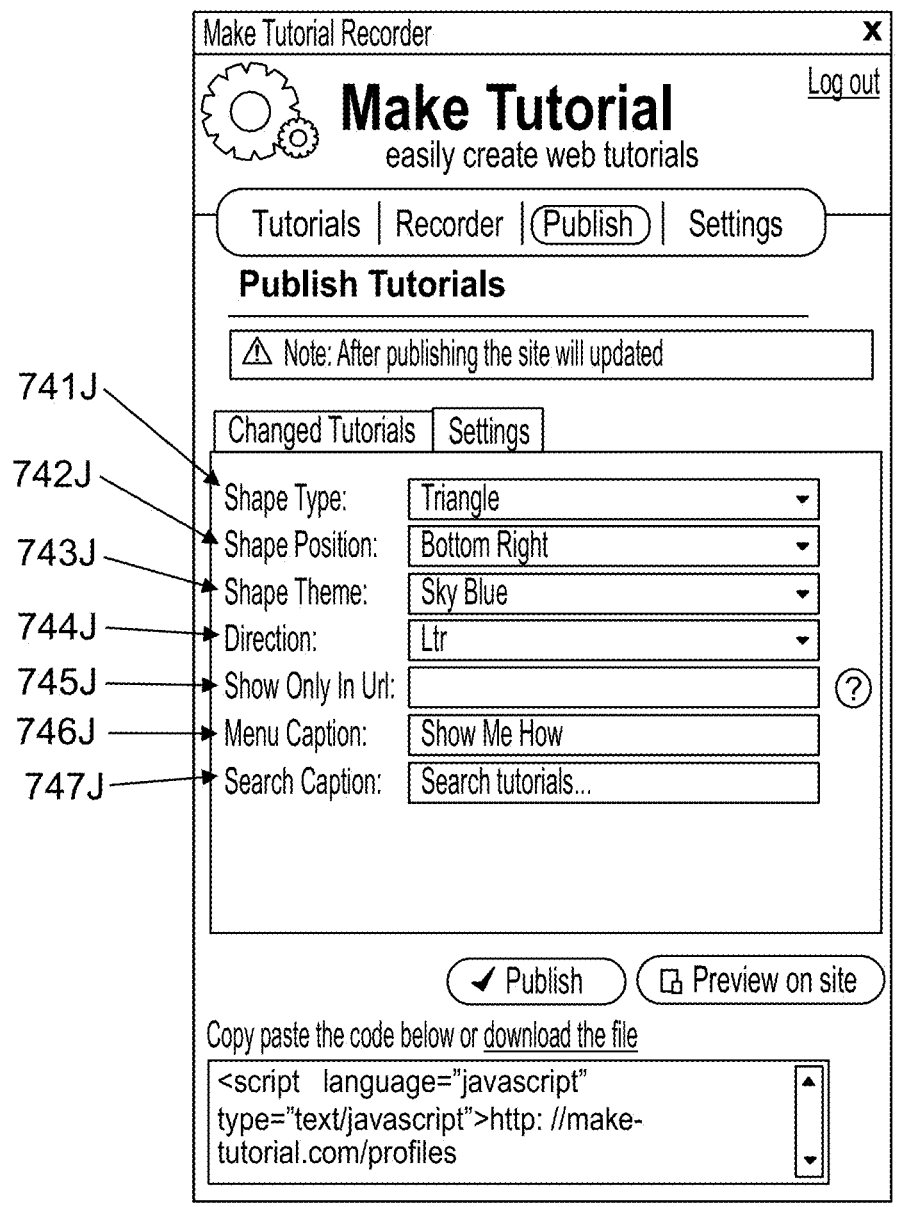
Figure 7K:
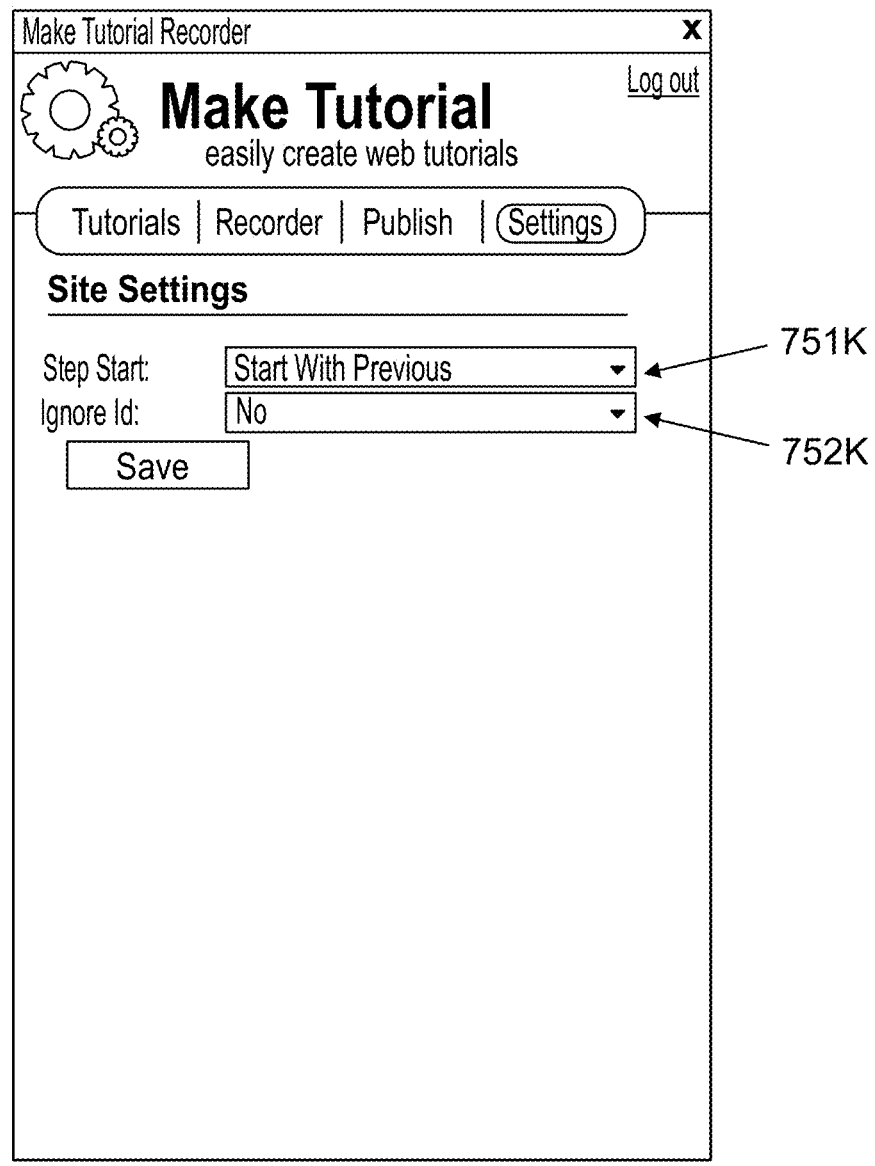

The creation of the tutorial may start with a login page 770A having a standard user name 771A and password 772A input boxes. Upon login the user can create a new tutorial. In this example the user clicks the "Add New Tutorial" button 785B in the "Tutorials tab" 781B. FIG. 7C illustrates an optional tutorial basic setup page 710C of the user interface for providing basic information about the newly created tutorial such as: tutorial name 705C, status 710C: published, developed etc., number of views by users 715C etc. The conditions for invoking the tutorial may be chosen as illustrated in FIG. 7D. The condition may be chosen from a predefined set of conditions 701D and/or may be created. Invoking conditions include: Uniform Resource Locator (URL) condition, step condition, auto step condition, redirected condition and/or a combination thereof. These conditions are captured in calling scripts. The translation of the user interface conditions to calling scripts may be performed in a backend. The user interface may allow including an optional 701E welcome step as shown in FIG. 7E. The welcome step may have a title 702E and a content 703. The captured descriptive elements may be presented in the user interface. The visual sequence of the steps may correspond with the sequential sequence in which the descriptive elements are presented in the tutorial. The sequence of the descriptive elements display in the tutorial may not be linear. The sequence may depend on a user response and/or other external inputs. An example of steps in a dynamically adaptable tutorial is illustrated in FIG. 7F. Steps 701F-708F are an example for captured descriptive elements and that as a group compose a tutorial for generating new price book with optional cloning content of an existing price book. Step 1 701F instructs a user to click on "Products". Step 2 702F instructs a user to click on "Manage Price Books". Step 3 703F instructs a user to click on "New". Step 4 704F instructs a user to enter the price book name. Step 5 705F instructs a user to choose if to active price book. Step 6 706F instructs a user to choose if to clone contents. Step 7 707F instructs the user to click save when the operation is complete. Step 8 708F displays the new price the user entered. Each step in the tutorial lists at least one descriptive element which is associated with at least one separate object of a web document. The tutorial may be further edited and modified after its initial setup. The descriptive elements are captures as illustrated in FIGS. 7G and 7H. A descriptive element may include: a title 720G, textual content 721G, content position 722G, start condition 723G, duration 724G, and/or delay 725G. The descriptive element may further include more advanced features such as: identifying text 726H, JQuery selector 727H which enables a user to use Jquery code to identify elements in the HTML page and by that override the identification algorithm, ability to ignore text 728H, ability to ignore id 729H, step sensitivity 730H which allow the user to make the identification algorithm to be more or less strict in order to enable identification of problematic elements. The user interface may further provide the ability to create a non linear step sequence as illustrated in FIG. 7I. Here the tutorial a multiple split 730I. The tutorial is split into multiple paths 731I-733I as a response to user browsed content: a click by a user 734I. Splitting a tutorial may be based on other external information other than user browsed content, for example available computational resources. The presentation parameters of descriptive elements of the dynamically adapted tutorial may be set as illustrated in FIG. 7J. In these examples the parameters include: shape type 741J, shape position 742J, shape theme 743J, direction 744J, show only in URL 745J, menu caption 746J, search caption 747J. The tutorial may also include parameters defined for the entire tutorial such as step start 751K, and ignored identification 752K as illustrated in FIG. 7K. The sequence of the steps shown in FIGS. 7A-7K for creating the dynamically adaptable tutorial may be modified.

It is expected that during the life of a patent maturing from this application many relevant web documents, calling scripts, browsing methods and/or servers will be developed and the scope of the terms web document, calling script, browsing and/or server are intended to include all such new technologies a priori.

As used herein the term "about" refers to ±10.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format.

It should be understood that the description in range format is merely for convenience and brevity and should not be construed as an inflexible limitation on the scope of the invention.

Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

What is claimed is:

1. A method of creating a dynamically adaptable tutorial, comprising:

selecting a website comprising at least one web document having a plurality of separate graphical user interface (GUI) elements each adapted for receiving an input from a browsing user;

instructing a browser to present said at least one web document in parallel to a user interface for defining a tutorial session of a multistep process related to said website and receiving from said user interface a plurality of descriptive elements which define said tutorial session, each having a plurality of displayed features, said user interface is used for associating each one of said plurality of descriptive elements with one of said plurality of separate GUI elements in said at least one web document and with a condition;

identifying a plurality of GUI element features of said plurality of separate GUI elements;

automatically generating a plurality of calling scripts each according to a respective said condition and one of said plurality of separate GUI elements;

embedding said plurality of calling scripts into a code for creating said at least one web document for sequentially presenting said plurality of descriptive elements on top of said at least one web document;

wherein said plurality of calling scripts are sequentially triggered by said browser user when said respective condition is met upon appropriate user interaction of said browser user with a respective GUI element from said plurality of separate GUI elements; and wherein each one of said plurality of displayed features is automatically determined according to said plurality of GUI element features so that display of respective said plurality of descriptive elements display correspond with said plurality of separate GUI elements.

2. The method of claim 1, further comprising replacing a first layout of said at least one web document with a second layout of said at least one web document and performing said tutorial session in accordance with said second layout without changing said plurality of descriptive elements.

3. The method of claim 1,
wherein each of said plurality of GUI element features is at least one of a graphical feature, a temporal feature, and a sound feature.

4. The method of claim 1, further comprising associating between each of said plurality of descriptive elements and said plurality of calling scripts without user generated code.

5. The method of claim 1, further comprising:
wherein said condition comprises one of a plurality of triggers defined for a plurality of separate GUI elements;
wherein said plurality of triggers activate said plurality of calling scripts which are associated with said plurality of separate GUI elements.

6. The method of claim 5, wherein said plurality of triggers are at least one of: clicking a separate GUI element, clicking an element of a separate GUI element, clicking a next button, typing characters with a keyboard, hovering over a separate GUI element, hovering over an element of a separate GUI element, time period elapsing and web document refreshes, web document redirected.

7. The method of claim 1, wherein said plurality of displayed features includes at least one of: location, shape, colors, type, position, theme and direction.

8. The method of claim 1, wherein sequential order of steps in said multistep process is modified via said user interface.

9. A network node for creating a dynamically adaptable tutorial, comprising:
a computing platform for executing a plurality of instructions for:
selecting a website comprising at least one web document having a plurality of separate graphical user interface (GUI) elements each adapted for receiving an input from a browsing user;
instructing a browser to present said at least one web document in parallel to a user interface for defining a tutorial session of a multistep process related to said website and receiving from said user interface a plurality of descriptive elements which define said tutorial session, each having a plurality of displayed features, said user interface is used for associating each one of said plurality of descriptive elements with one of said plurality of separate GUI elements in said at least one web document and with a condition;

identifying a plurality of GUI element features of said plurality of separate GUI elements;

automatically generating a plurality of calling scripts each according to a respective said condition and one of said plurality of separate GUI elements;

embedding said plurality of calling scripts into a code for creating said at least one web document for sequentially presenting said plurality of descriptive elements on top of said at least one web document;

wherein said plurality of calling scripts are sequentially triggered by said browser user when said respective condition is met upon appropriate user interaction of said browser user with a respective GUI element from said plurality of separate GUI elements; and wherein each one of said plurality of displayed features is automatically determined according to said plurality of GUI element features so that display of respective said plurality of descriptive elements correspond with said plurality of separate GUI elements.

10. The network node of claim 9, wherein said computing platform executes instructions for modifying said plurality of descriptive elements according to data selected from a group consisting of settings of a browser, browser type, location, previously visited websites, tutorial statistics and website analytics.

11. The network node of claim 9, wherein a content retrieved by said computing platform is associated with a user for adjusting said dynamically adaptable tutorial according to said content.

12. The network node of claim 9, wherein said computing platform is executed on a server and said plurality of calling scripts executed by an end user device hosting said browser.

13. The network node of claim 12, wherein said at least one web document is supported by said server.

14. The network node of claim 9, wherein said computing platform executes instructions for recognizing at least one of said plurality of separate GUI elements when said at least one web document is browsed to and triggering at least one of said plurality of calling scripts in response to said recognizing.

15. The network node of claim 14, wherein at least one of said plurality of calling scripts splits said tutorial session into a plurality of sequences of presenting said descriptive elements.

16. The network node of claim 14, further comprising:
modifying said plurality of descriptive elements sequential presentation according to a current display of at least one of said plurality of separate GUI elements.

17. A method of presenting a dynamically adaptable tutorial, comprising:
loading to a browser a code of a web document having a plurality of separate GUI elements and a plurality of calling scripts each associated with a condition and one of a plurality of descriptive elements each having a plurality of displayed features;
sequentially presenting said plurality of descriptive elements to a browser user on top of said web document, each one of said plurality of descriptive elements is presented in proximity to one of said plurality of separate GUI elements for walking a browser user accessing said web document through a multistep process while said browser user browses said web document;

wherein each one of said plurality of displayed features is automatically determined according to a plurality of GUI element features of said plurality of separate GUI elements, so that display of respective said plurality of descriptive elements correspond with said plurality of separate GUI elements; and wherein said plurality of calling scripts are sequentially triggered by said browser user when said respective condition is met upon appropriate user interaction of said browser user with a respective GUI element from said plurality of separate GUI elements.

\* \* \* \* \*